United States Patent
Gupta et al.

(10) Patent No.: US 10,754,895 B2
(45) Date of Patent: Aug. 25, 2020

(54) EFFICIENT METADATA DESTAGE DURING SAFE DATA COMMIT OPERATION

(71) Applicant: International Business Machines Corporation, Armonk, NY (US)

(72) Inventors: Lokesh M. Gupta, Tucson, AZ (US); Edward Lin, Tucson, AZ (US); Kyler A. Anderson, Sahuarita, AZ (US); Matthew G. Borlick, Tucson, AZ (US); Kevin J. Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/162,391

(22) Filed: Oct. 17, 2018

(65) Prior Publication Data
US 2020/0125684 A1 Apr. 23, 2020

(51) Int. Cl.
*G06F 12/14* (2006.01)
*G06F 16/907* (2019.01)
*G06F 12/0877* (2016.01)
*G06F 12/0804* (2016.01)
*G06F 16/16* (2019.01)

(52) U.S. Cl.
CPC ........ *G06F 16/907* (2019.01); *G06F 12/0804* (2013.01); *G06F 12/0877* (2013.01); *G06F 16/164* (2019.01)

(58) Field of Classification Search
CPC ...... G06F 12/0866; G06F 1/0873; G06F 9/52; G06F 11/1464; G06F 11/0724
See application file for complete search history.

(56) References Cited

U.S. PATENT DOCUMENTS

| | | | |
|---|---|---|---|
| 6,816,952 B1 * | 11/2004 | Vartti | G06F 9/52 711/163 |
| 7,822,749 B2 | 10/2010 | Prahlad et al. | |
| 2003/0051113 A1 * | 3/2003 | Beardsley | G06F 12/0866 711/163 |
| 2003/0070041 A1 * | 4/2003 | Beardsley | G06F 11/0724 711/113 |
| 2006/0069888 A1 | 3/2006 | Martinez | |
| 2007/0260717 A1 * | 11/2007 | Kano | G06F 11/1464 709/223 |
| 2017/0109283 A1 * | 4/2017 | Ash | G06F 12/0873 |

FOREIGN PATENT DOCUMENTS

CN 108038225 A1 5/2018

* cited by examiner

*Primary Examiner* — Ryan Bertram
*Assistant Examiner* — Trang K Ta
(74) *Attorney, Agent, or Firm* — Nelson and Nelson; Daniel P. Nelson; Alexis V. Nelson

(57) ABSTRACT

A method for reducing I/O performance impacts associated with a data commit operation is disclosed. In one embodiment, such a method includes periodically performing a data commit operation wherein modified data is destaged from cache to persistent storage drives. Upon performing a particular instance of the data commit operation, the method determines whether modified data in the cache is a metadata track. In the event the modified data is a metadata track, the method attempts to acquire an exclusive lock on the metadata track. In the event the exclusive lock cannot be acquired, the method skips over the metadata track without destaging the metadata track for the particular instance of the data commit operation. A corresponding system and computer program product are also disclosed.

20 Claims, 6 Drawing Sheets

EFFICIENT METADATA DESTAGE DURING SAFE DATA COMMIT OPERATION

BACKGROUND

Field of the Invention

This invention relates to systems and methods for maintaining I/O performance in storage systems.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, local hard drives, local solid state drives, etc.). The memory may include a cache, such as a DRAM cache. Whenever a host (e.g., an open system or mainframe server) performs a read operation, the server that performs the read may fetch data from the storage drives and save it to its cache in the event it is required again. If the data is requested again by a host, the server may fetch the data from the cache instead of fetching it from the storage drives, saving both time and resources. Similarly, when a host performs a write, the server that receives the write request may store the modified data in its cache, and destage the modified data to the storage drives at a later time. When modified data is stored in cache, the modified data may also be stored in non-volatile storage (NVS) of the opposite server so that the modified data can be recovered by the opposite server in the event the first server fails.

In some cases, certain operations may be executed on a storage system that completely destage all modified data in a cache or NVS to the storage drives. For example, in the IBM DS8000™ enterprise storage system, a "Safe Data" commit operation may be executed periodically (e.g., every hour) that completely destages all data in the cache or NVS to the storage drives. This operation provides assurance that, if data loss does occur, it only involves modified data written since the last "Safe Data" commit operation. Unfortunately, because the "Safe Data" commit operation ties up various resources on the storage system, users may experience significant spikes in I/O response times during this operation. These spikes may unacceptably impact I/O performance on storage systems such as the IBM DS8000™ enterprise storage system.

In view of the foregoing, what are needed are systems and methods to reduce performance impacts that occur during execution of operations such as the "Safe Data" commit operation. Ideally, such systems and methods will fully maintain protections to modified data.

SUMMARY

The invention has been developed in response to the present state of the art and, in particular, in response to the problems and needs in the art that have not yet been fully solved by currently available systems and methods. Accordingly, systems and methods have been developed to reduce I/O performance impacts associated with data commit operations. The features and advantages of the invention will become more fully apparent from the following description and appended claims, or may be learned by practice of the invention as set forth hereinafter.

Consistent with the foregoing, a method for reducing I/O performance impacts associated with a data commit operation is disclosed. In one embodiment, such a method includes periodically performing a data commit operation wherein modified data is destaged from cache to persistent storage drives. Upon performing a particular instance of the data commit operation, the method determines whether modified data in the cache is a metadata track. In the event the modified data is a metadata track, the method attempts to acquire an exclusive lock on the metadata track. In the event the exclusive lock cannot be acquired, the method skips over the metadata track without destaging the metadata track for the particular instance of the data commit operation.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
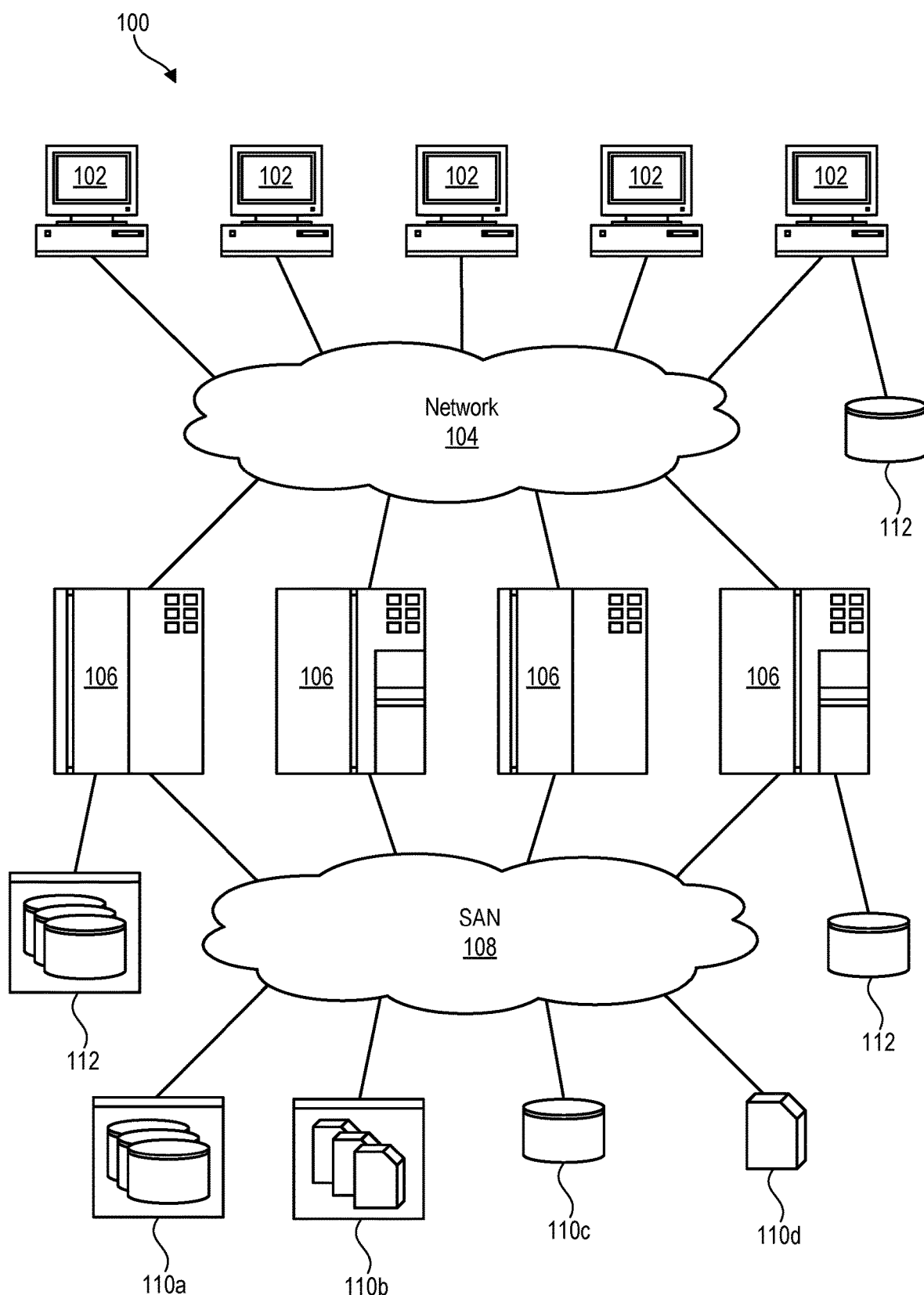
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
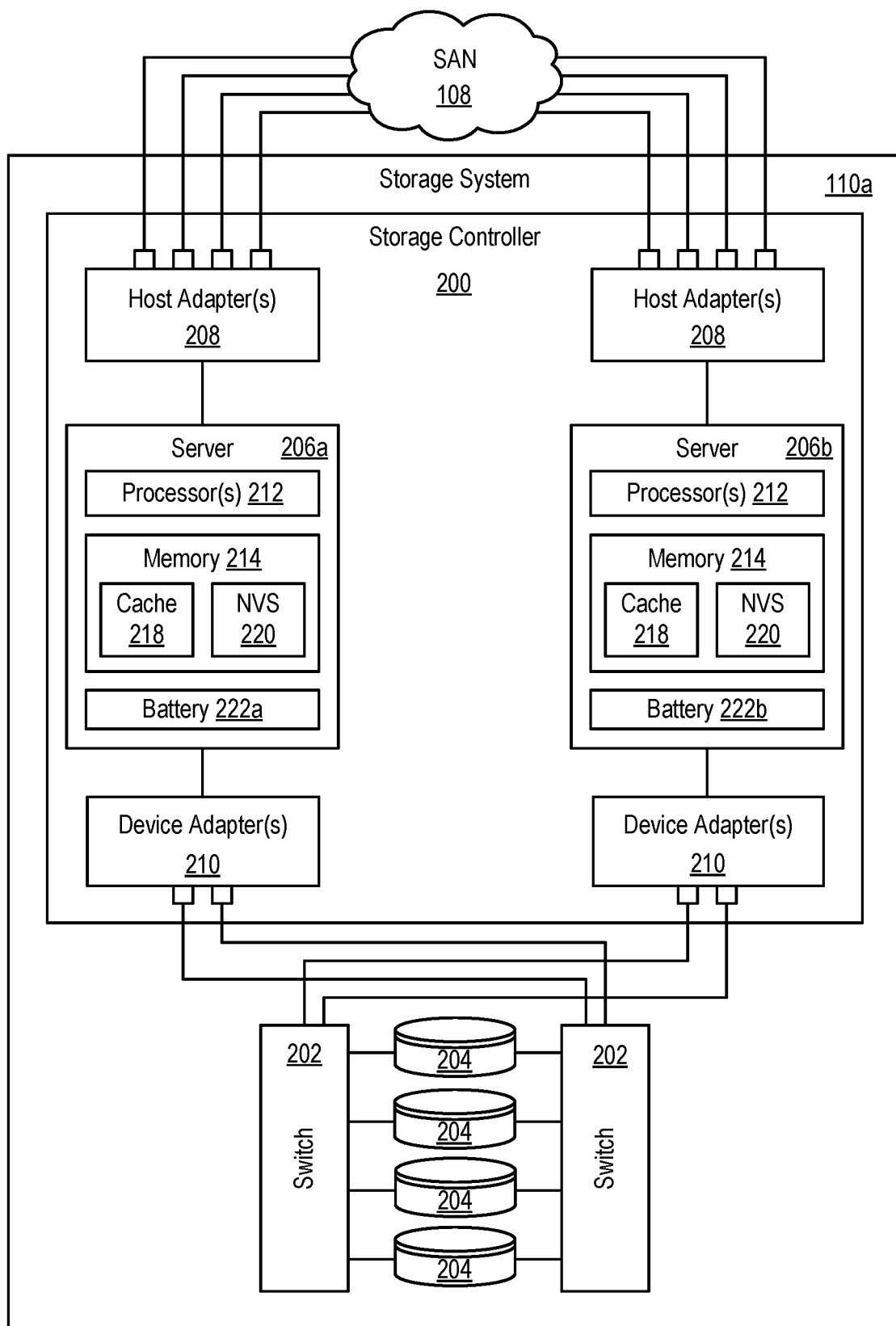
FIG. 2 is a high-level block diagram showing one example of a storage system in which systems and methods in accordance with the invention may be implemented.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the modified data in its cache 218, and destage the modified data to the storage drives 204 at a later time. When modified data is stored in cache 218, the modified data may also be stored in non-volatile storage (NVS) 220 of the opposite server 206 so that the modified data can be recovered by the opposite server 206 in the event the first server 206 fails. In certain embodiments, the NVS 220 is implemented as battery-backed volatile memory or cache in the opposite server 206. As shown in FIG. 2, each server 206a, 206b may include a battery 222a, 222b (e.g., an uninterruptible power supply) to provide backup power to the servers 206a, 206b in the event primary power is interrupted.

In certain cases, certain operations may be executed on a storage system 110 that completely destage all modified data in the cache 218 or NVS 220 to the storage drives. For example, in the IBM DS8000™ enterprise storage system, a "Safe Data" commit operation may be executed periodically (e.g., every hour) that completely destages all data in the cache 218 or NVS 220 to the storage drives 204. This operation provides assurance that, if data loss does occur, it only involves modified data written since the last "Safe Data" commit operation. Unfortunately, because the "Safe Data" commit operation ties up various resources on the storage system 110, users may experience spikes in I/O response times during this operation. These spikes may unacceptably impact I/O performance on storage systems 110 such as the IBM DS8000™ enterprise storage system 110. Thus, systems and methods are needed to reduce performance impacts that occur during execution of operations such as the "Safe Data" commit operation. Ideally, such system and methods will fully maintain protections to modified data.

Figure 3:
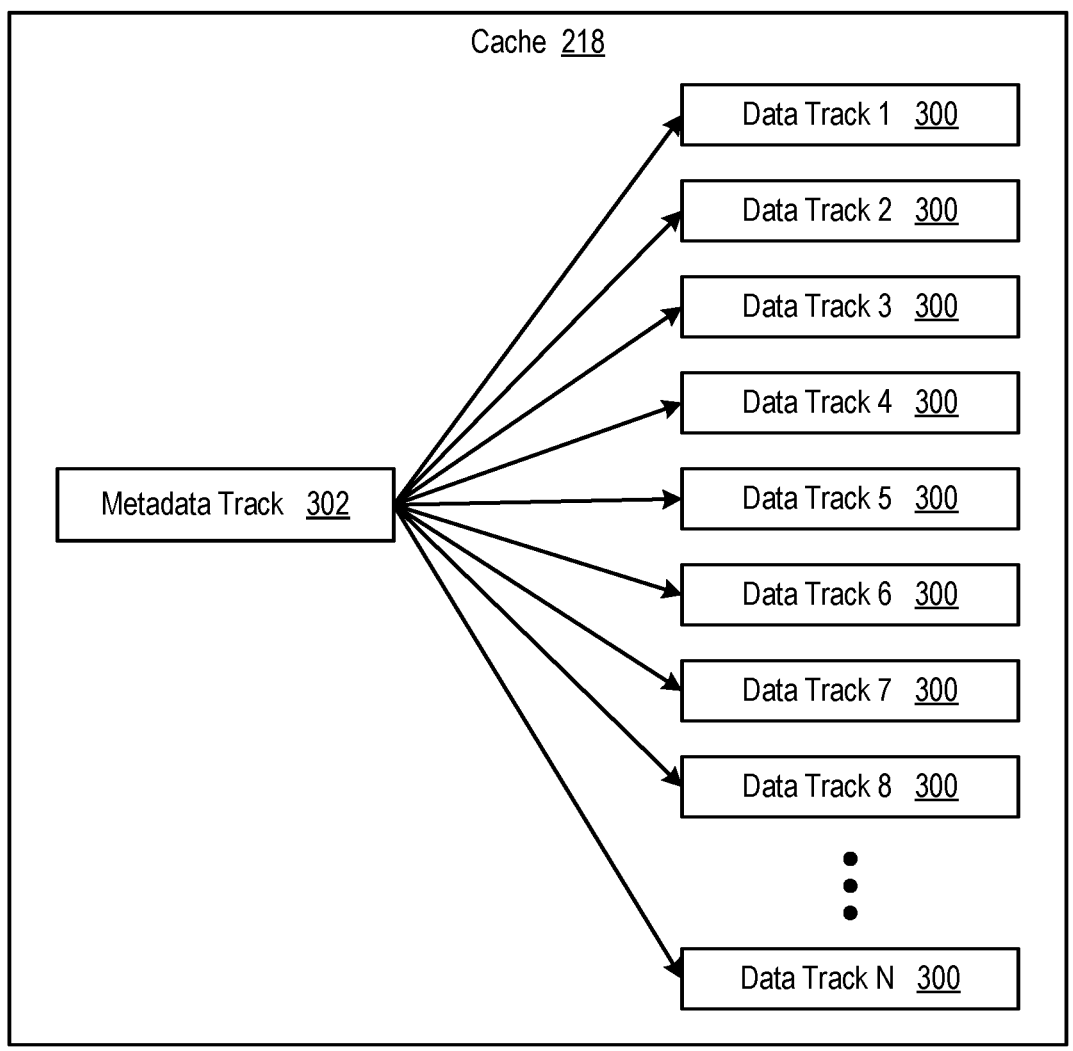
FIG. 3 is a high-level block diagram showing a metadata track and associated data tracks in cache.

Referring to FIG. 3, when data is destaged from the cache 218 or NVS 220 to storage drives 204 using an operation such as the "Safe Data" commit operation, the data may be destaged in units referred to herein as "tracks." The term "tracks" is used broadly herein to refer generally to storage elements or data units of designated sizes. These tracks may include both data tracks 300 and metadata tracks 302. The metadata tracks 302 may contain metadata that describes data in the data tracks 300. In certain embodiments, a large number of data tracks 300 may correspond to a single metadata track 302. That is, a single metadata track 302 may contain metadata for a large number of data tracks 300, in some cases as many as one thousand data tracks 300 or more.

Figure 4:
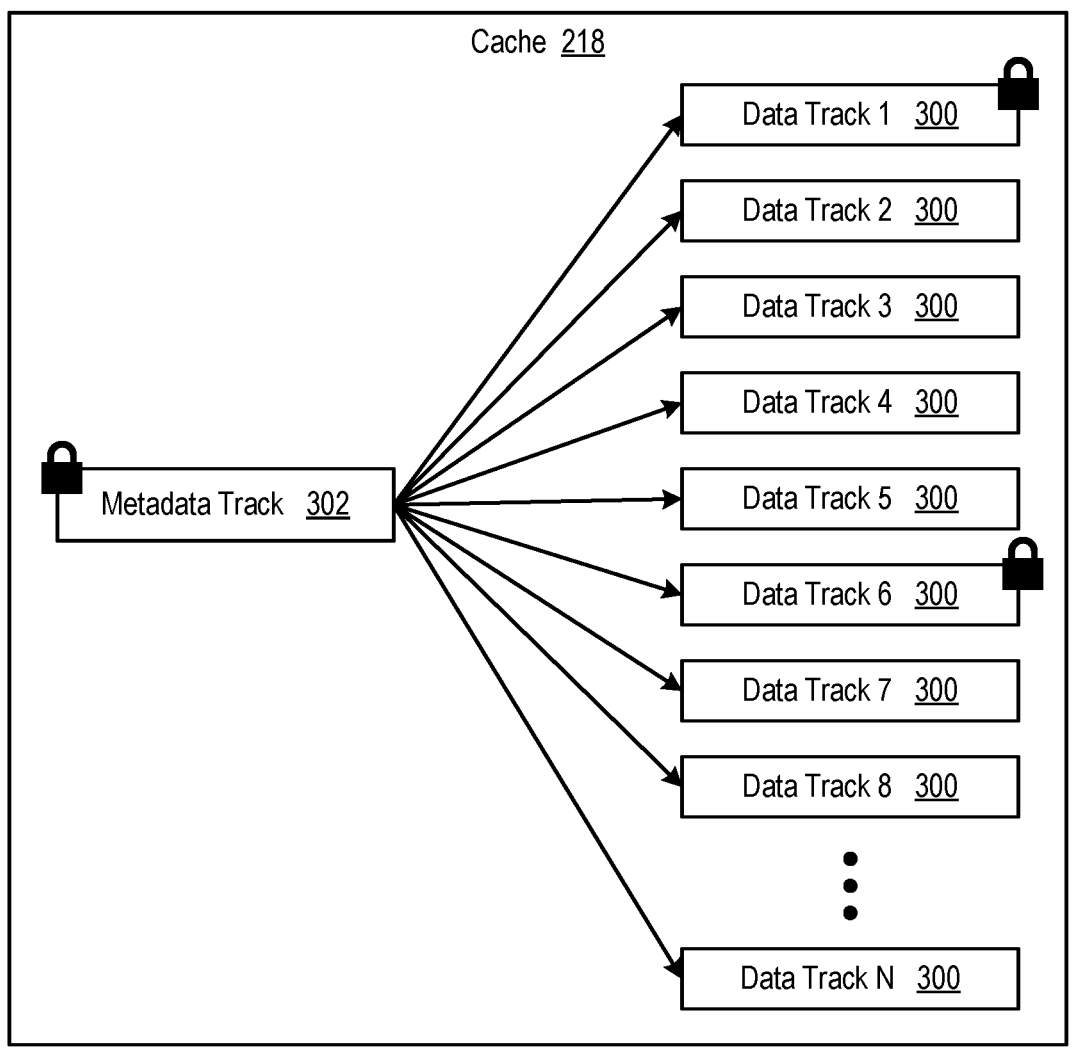
FIG. 4 is a high-level block diagram showing locks on a metadata track and associated data tracks in cache.

Thus, when a data track 300 is accessed in the cache 218 or NVS 220, access may also be required to the metadata track 302 associated with the data track 300 to read or update metadata associated with the data track 300. As a result, when a lock is acquired on a data track 300 to access data therein, a lock may also be required on the associated metadata track 302, as shown in FIG. 4. During the "Safe Data" commit operation, data tracks 300 as well as metadata tracks 302 may be destaged from the cache 218 or NVS 220 to more persistent storage drives 204. During this destage process, the "Safe Data" commit operation may acquire an exclusive lock on the data tracks 300 and metadata track 302, thereby preventing other tasks from accessing these tracks.

This may be particularly problematic when destaging a metadata track 302. Because a metadata track 302 may store metadata associated with a large number of data tracks 300, placing an exclusive lock on a metadata track 302 may prevent access to all of the data tracks 300 associated with the metadata track 302 while the destage is occurring. This may cause I/O response times to spike significantly when destaging a metadata track 302 from the cache 218 or NVS 220 to the storage drives 204, as occurs during the "Safe Data" commit operation.

In certain embodiments, a destage operation such as the "Safe Data" commit operation may be modified in various ways to prevent I/O response times from spiking. For example, in certain embodiments, when encountering a metadata track 302 during a destage operation, systems and methods in accordance with the invention may attempt to acquire an exclusive lock on the metadata track 302. If the exclusive lock cannot be acquired immediately, the destage operation may skip over the metadata track 302 and increment a count to indicate that the attempt to destage the metadata track 302 was unsuccessful. If the metadata track 302 is lost at some later point in time, the metadata track 302 may be reconstructed from the data tracks 300 that are associated with the metadata track 302. That is, by analyzing data in the data tracks 300 that are associated with the metadata track 302, the metadata in the metadata track 302 may be reconstructed. Thus, skipping over the metadata track 302 may not expose a user to potential data loss.

Figure 5:
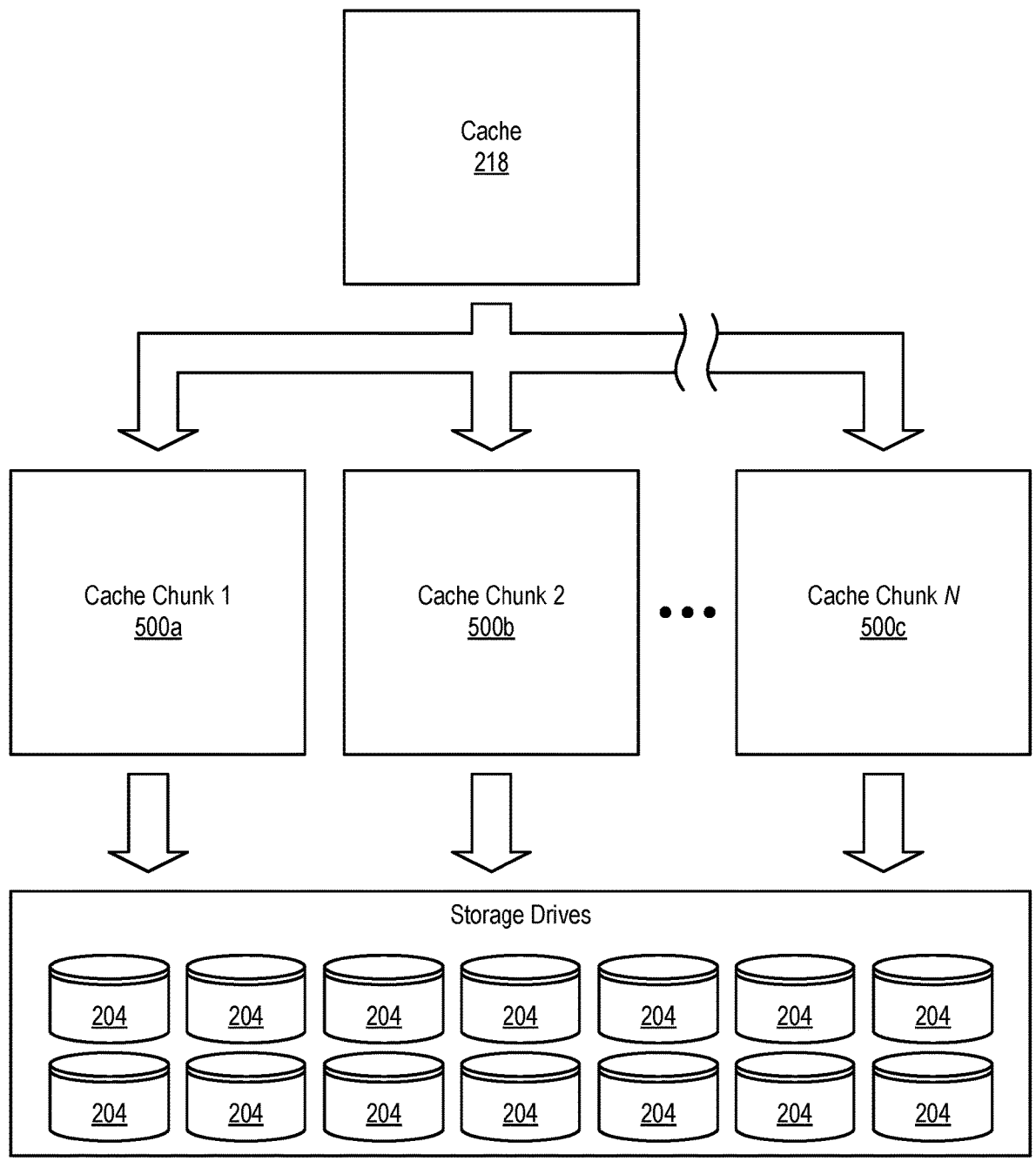
FIG. 5 is a high-level block diagram showing a process for destaging tracks from cache to storage drives in parallel.

Referring to FIG. 5, in certain embodiments, data tracks 300 and metadata tracks 302 may be destaged from the cache 218 or NVS 220 to more persistent storage drives 204 by several tasks operating in parallel. In certain embodiments, this may be accomplished by partitioning a cache directory associated with a cache 218 into equally sized chunks. This will essentially divide the cache 218 into equally sized chunks 500a-c. A certain number of task control blocks (TCBs) may then be created and dispatched to process the cache directory chunks. As long as cache directory chunks are available, each task control block may obtain a cache directory chunk and process the data tracks 300 and metadata tracks 302 identified therein. This may continue until all cache directory chunks are processed.

While processing a chunk 500 of cache 218, if a data track 300 is encountered that contains modified data, the task control block may acquire an exclusive lock on the data track 300 and destage the data track 300 to the storage drives 204. If necessary, the task control block may wait to acquire the exclusive lock on the data track 300 before destaging it. By contrast, if a metadata track 302 is encountered that contains modified data, the task control block may attempt to acquire an exclusive lock on the metadata track 302. If the task control block cannot immediately acquire the exclusive lock, the task control block may skip over the metadata track 302 and increment a count of unsuccessful metadata track destages. If, on the other hand, the task control block is able to immediately acquire the exclusive lock, the task control block may acquire the exclusive lock and destage the metadata track 302 to the storage drives 204.

Figure 6:
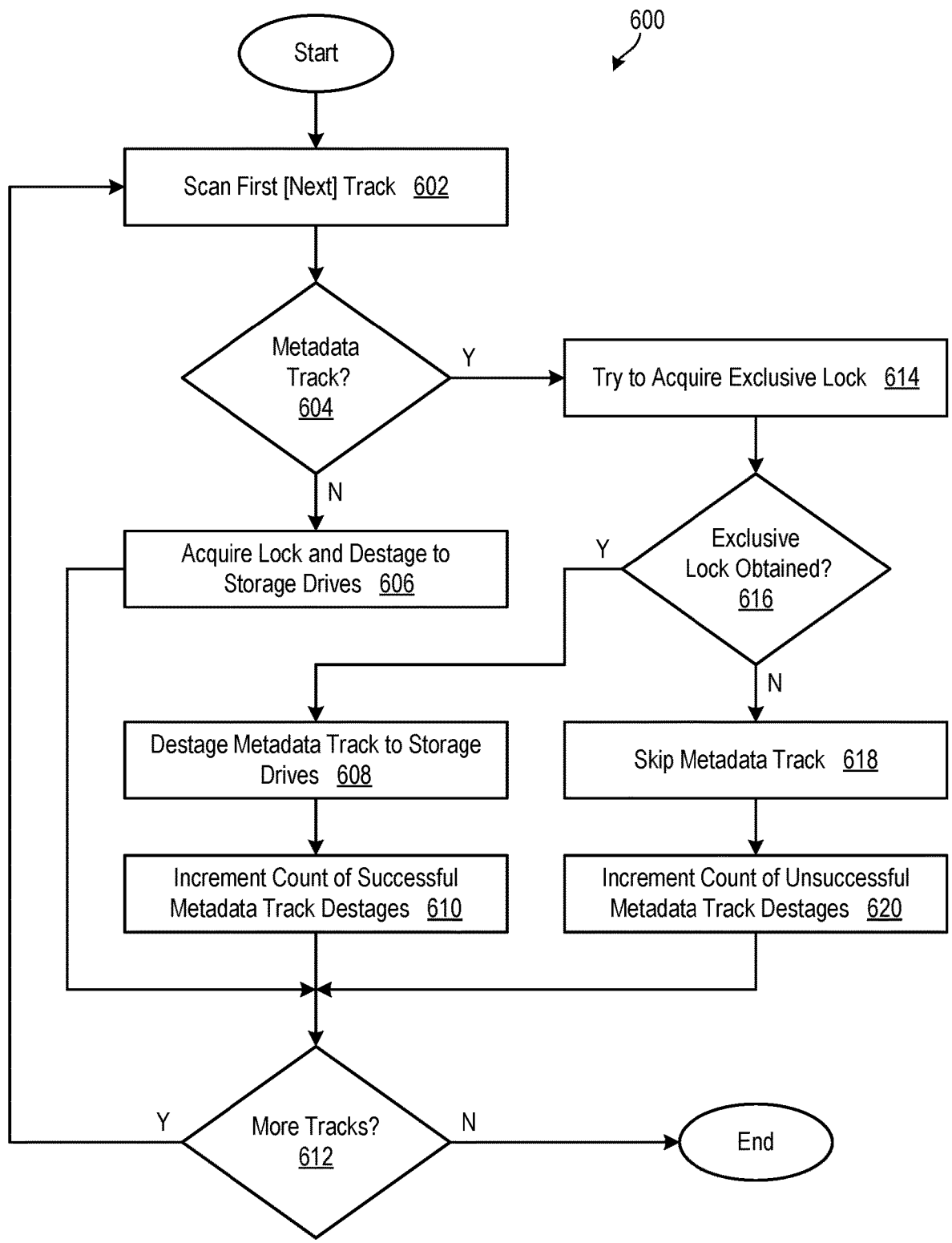
FIG. 6 is a process flow diagram showing a method for destaging tracks from cache to storage drives.

Referring to FIG. 6, one embodiment of a method 600 for destaging tracks from the cache 218 to the storage drives 204 is illustrated. For the purposes of this disclosure, the cache 218 may also include the NVS 220. Such a method 600 may, in certain embodiments, be executed by a task control block. As shown, when a task control block is assigned a chunk 500 of cache 218, the task control block may scan 602 the first track in the chunk 500. If the track is a data track 300 containing modified data, the task control block may acquire 606 an exclusive lock on the data track 300 and destage 606 the data track 300 from the cache 218 to the storage drives 204.

If, on the other hand, the track is a metadata track 302, the task control block may attempt 614 to acquire an exclusive lock on the metadata track 302. If the exclusive lock is obtained 616, the task control block may destage 608 the metadata track 302 to the storage drives 204 and increment 610 a count of successful metadata track destages. If the exclusive lock cannot be obtained 616, the task control block may skip 618 over the metadata track 302 (without destaging the metadata track 302 to the storage drives 204) and increment 620 a count of unsuccessful metadata track destages. Ideally, this will reduce or prevent spikes in I/O response times since tasks will not be prevented from accessing the metadata track 302 or data tracks 300 that are associated with the metadata track 302. As previously mentioned, if the skipped metadata track 302 is eventually lost, the metadata track 302 may be reconstructed from data tracks 300 that are associated with the metadata track 302.

At this point, the task control block determines 612 if there are any more tracks in the chunk 500 to process. If so, the task control block may process the next track in the chunk 500 in the manner previously described. If not, the method 600 ends for the chunk 500 that is being processed. If more chunks still remain to be processed, the task control block may obtain the next chunk 500 and execute the method 600 on the next chunk 500 in the manner previously described.

The count of successful metadata track destages and the count of unsuccessful metadata track destages may be compared by a user to get an idea of the number of metadata track destages that are successful and unsuccessful. In certain embodiments, a ratio or percentage may be provided to a user to determine how often or frequently metadata tracks 302 are skipped over during a destage operation such as the "Safe Data" commit operation.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for reducing I/O performance impacts associated with a data commit operation, the method comprising:
periodically performing a data commit operation wherein modified data is destaged from cache to persistent storage drives;
upon performing a particular instance of the data commit operation, determining whether modified data encountered in the cache is a metadata track or a non-metadata track;
in the event the modified data is a metadata track, attempting to acquire an exclusive lock on the metadata track;
in the event the exclusive lock cannot be acquired, skipping over the metadata track without destaging the metadata track for the particular instance of the data commit operation; and
terminating the particular instance of the data commit operation once all of the following has been completed: (1) modified non-metadata tracks have been successfully destaged from the cache to the persistent storage drives; (2) modified metadata tracks for which an exclusive lock could be acquired have been successfully destaged from the cache to the persistent storage drives; and (3) modified metadata tracks for which an exclusive lock could not be acquired have been skipped over and not destaged from the cache to the persistent storage drives.

2. The method of claim 1, further comprising, in the event the exclusive lock cannot be acquired, incrementing a count of unsuccessful metadata track destages.

3. The method of claim 1, further comprising, in the event the exclusive lock can be acquired, destaging the metadata track from the cache to the persistent storage drives.

4. The method of claim 3, further comprising, in the event the metadata track is destaged from the cache to the persistent storage drives, incrementing a count of successful metadata track destages.

5. The method of claim 1, wherein performing the particular instance of the data commit operation comprises partitioning the cache into chunks.

6. The method of claim 5, further comprising processing the chunks in parallel.

7. The method of claim 5, wherein partitioning the cache into chunks comprises partitioning a cache directory associated with the cache into chunks.

8. A computer program product for reducing I/O performance impacts associated with a data commit operation, the computer program product comprising a computer-readable storage medium having computer-usable program code embodied therein, the computer-usable program code configured to perform the following when executed by at least one processor:
periodically perform a data commit operation wherein modified data is destaged from cache to persistent storage drives;
upon performing a particular instance of the data commit operation, determine whether modified data encountered in the cache is a metadata track or a non-metadata track;
in the event the modified data is a metadata track, attempt to acquire an exclusive lock on the metadata track;
in the event the exclusive lock cannot be acquired, skip over the metadata track without destaging the metadata track for the particular instance of the data commit operation; and
terminate the particular instance of the data commit operation once all of the following has been completed: (1) modified non-metadata tracks have been successfully destaged from the cache to the persistent storage drives; (2) modified metadata tracks for which an exclusive lock could be acquired have been successfully destaged from the cache to the persistent storage drives; and (3) modified metadata tracks for which an exclusive lock could not be acquired have been skipped over and not destaged from the cache to the persistent storage drives.

9. The computer program product of claim 8, wherein the computer-usable program code is further configured to, in the event the exclusive lock cannot be acquired, increment a count of unsuccessful metadata track destages.

10. The computer program product of claim 8, wherein the computer-usable program code is further configured to, in the event the exclusive lock can be acquired, destage the metadata track from the cache to the persistent storage drives.

11. The computer program product of claim 10, wherein the computer-usable program code is further configured to, in the event the metadata track is destaged from the cache to the persistent storage drives, increment a count of successful metadata track destages.

12. The computer program product of claim 8, wherein performing the particular instance of the data commit operation comprises partitioning the cache into chunks.

13. The computer program product of claim 12, wherein the computer-usable program code is further configured to process the chunks in parallel.

14. The computer program product of claim 12, wherein partitioning the cache into chunks comprises partitioning a cache directory associated with the cache into chunks.

15. A system for reducing I/O performance impacts associated with a data commit operation, the system comprising:
at least one processor;
at least one memory device operably coupled to the at least one processor and storing instructions for execution on the at least one processor, the instructions causing the at least one processor to:
periodically perform a data commit operation wherein modified data is destaged from cache to persistent storage drives;
upon performing a particular instance of the data commit operation, determine whether modified data encountered in the cache is a metadata track or a non-metadata track;
in the event the modified data is a metadata track, attempt to acquire an exclusive lock on the metadata track;
in the event the exclusive lock cannot be acquired, skip over the metadata track without destaging the metadata track for the particular instance of the data commit operation; and
terminate the particular instance of the data commit operation once all of the following has been completed: (1) modified non-metadata tracks have been successfully destaged from the cache to the persistent storage drives; (2) modified metadata tracks for which an exclusive lock could be acquired have been successfully destaged from the cache to the persistent storage drives; and (3) modified metadata tracks for which an exclusive lock could not be acquired have been skipped over and not destaged from the cache to the persistent storage drives.

16. The system of claim 15, wherein the instructions further cause the at least one processor to, in the event the exclusive lock cannot be acquired, increment a count of unsuccessful metadata track destages.

17. The system of claim 15, wherein the instructions further cause the at least one processor to, in the event the exclusive lock can be acquired, destage the metadata track from the cache to the persistent storage drives.

18. The system of claim 17, wherein the instructions further cause the at least one processor to, in the event the metadata track is destaged from the cache to the persistent storage drives, increment a count of successful metadata track destages.

19. The system of claim 15, wherein performing the particular instance of the data commit operation comprises partitioning the cache into chunks.

20. The system of claim 19, wherein the instructions further cause the at least one processor to process the chunks in parallel.

* * * * *